(No Model.) 3 Sheets—Sheet 1.

W. H. HONISS.
PAPER BAG.

No. 333,523. Patented Jan. 5, 1886.

Witnesses:
Frank H. Pierpont
Albert H. Walker

Inventor
William H. Honiss.

(No Model.)

W. H. HONISS.
PAPER BAG.

No. 333,523.

3 Sheets—Sheet 2.

Patented Jan. 5, 1886.

Witnesses:
Frank H. Pierpont
Albert H. Walker

Inventor
William H. Honiss.

(No Model.) W. H. HONISS. 3 Sheets—Sheet 3.
PAPER BAG.
No. 333,523. Patented Jan. 5, 1886.
Fig. 18.
Fig. 19.
Fig. 20.
Fig. 21.
Fig. 22.
Fig. 23.
Fig. 24.
Fig. 25.
Fig. 26.
Fig. 27.
Fig. 28.
Fig. 29.
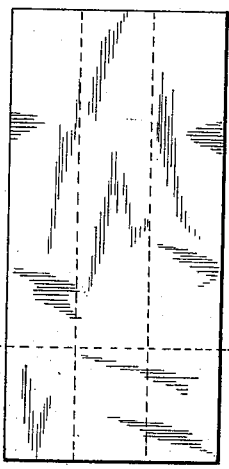
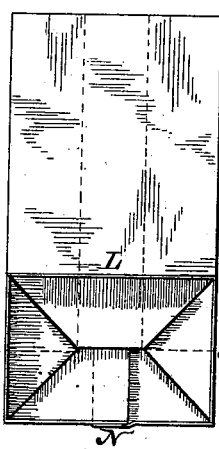
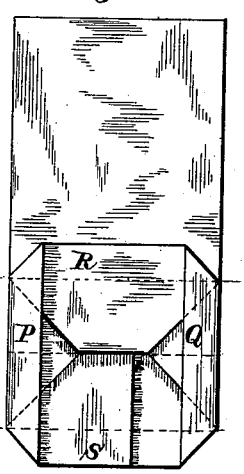
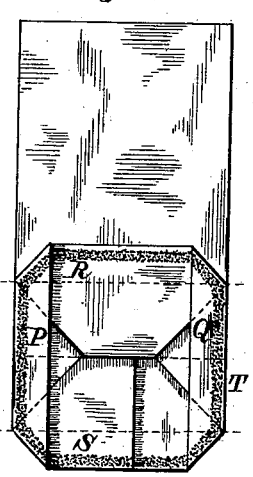
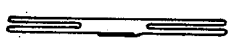
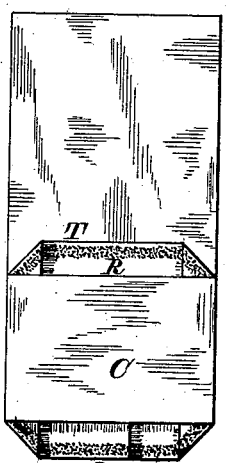
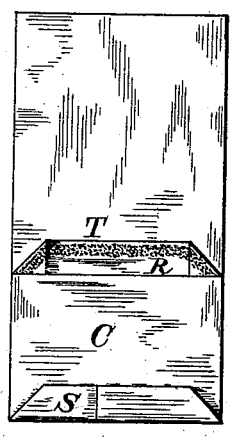
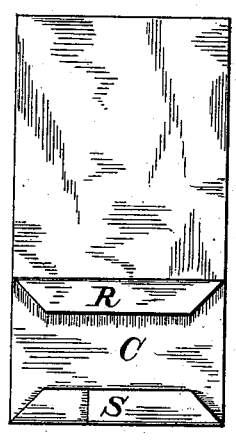
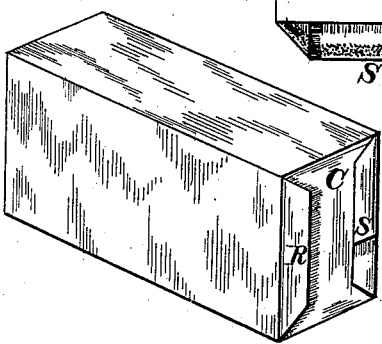
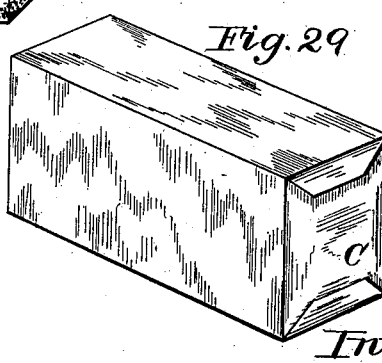
Witnesses:
Frank H. Pierpont
Albert H. Walker
Inventor
William H. Honiss.
N. PETERS, Photo-Lithographer, Washington, D. C.

UNITED STATES PATENT OFFICE.

WILLIAM H. HONISS, OF HARTFORD, CONNECTICUT, ASSIGNOR TO FELIX W. LEINBACH AND CLARENCE A. WOLLE, BOTH OF BETHLEHEM, PA.

PAPER BAG.

SPECIFICATION forming part of Letters Patent No. 333,523, dated January 5, 1886.

Application filed October 1, 1884. Serial No. 144,452. (No model.)

*To all whom it may concern:*

Be it known that I, WILLIAM H. HONISS, of Hartford, Connecticut, have invented a new and useful Improvement in Paper Bags, of which the following description and claim constitute the specification, and which is illustrated by the accompanying three sheets of drawings.

This invention consists in a paper bag which has its bottom constructed in a new and useful manner.

Figure 1:
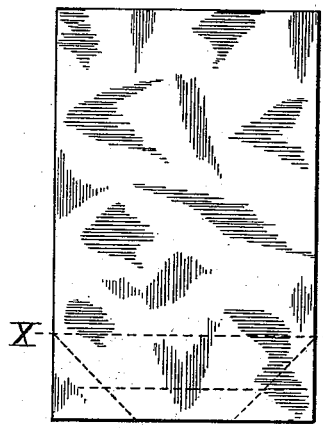
Figure 4:
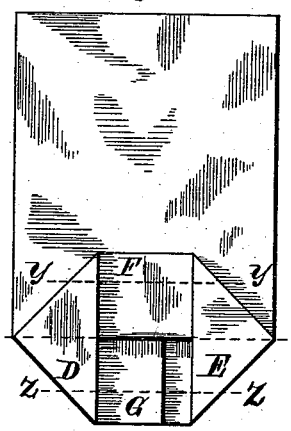
Figure 5:
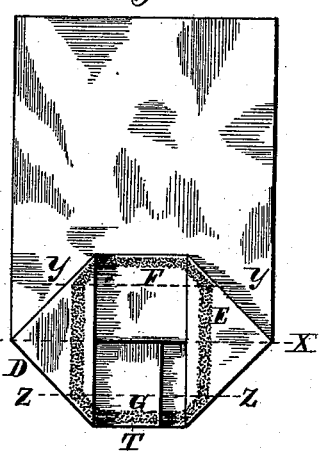
Figure 2:
Figure 3:
Figure 6:
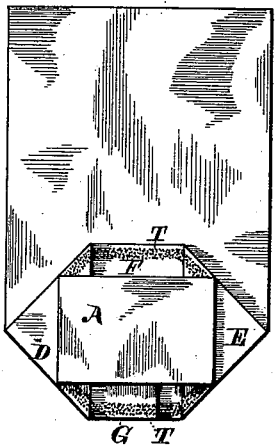
Figure 7:
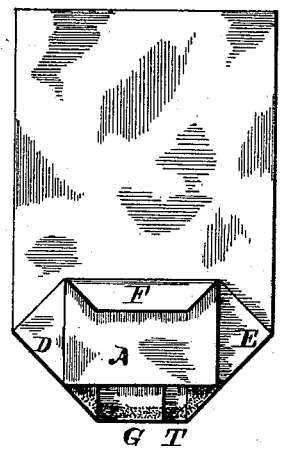
Figure 8:
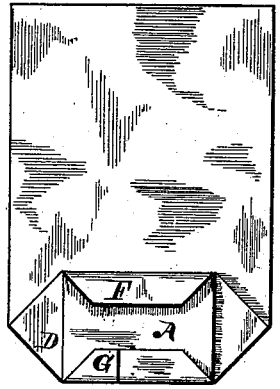
Figure 9:
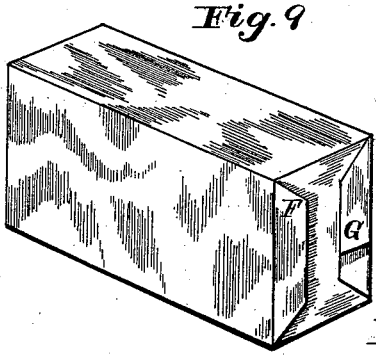
Figure 10:
Figure 11:
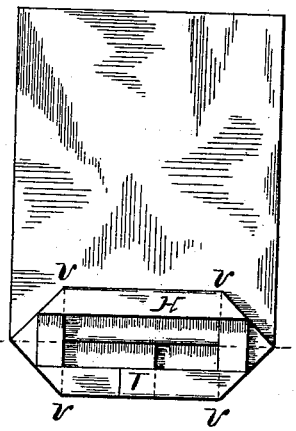
Figure 12:
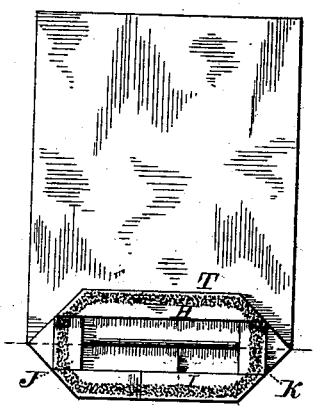
Figure 14:
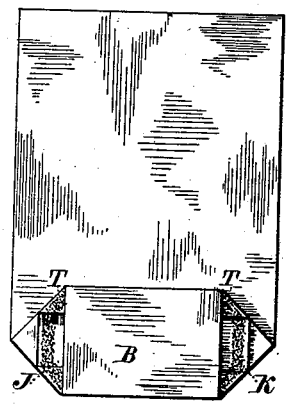
Figure 15:
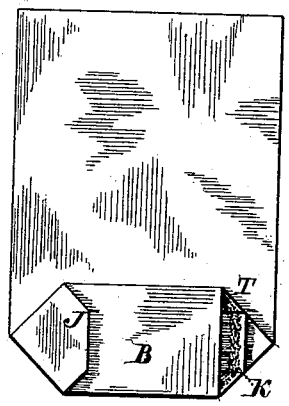
Figure 13:
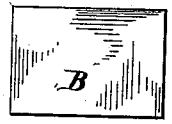
Figure 16:
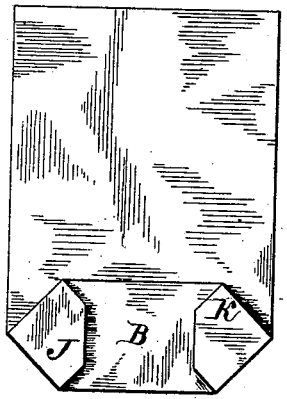
Figure 17:
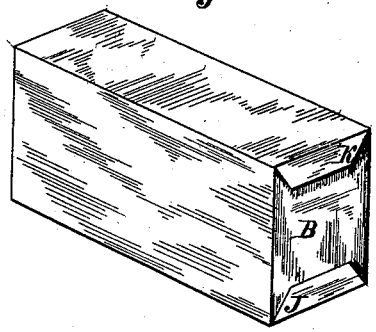

Figure 1 of the drawings is a view of the upper side of a flat paper tube suitable for making a satchel-bottom bag, and Fig. 2 is a view of the lower end of the same. Fig. 3 is a view of a rectangular piece of paper substantially identical in size with the bottom of the bag when the bag is opened out. Fig. 4 is a view of the blank of Figs. 1 and 2 after the first fold in the process of making the bottom of the bag has been properly produced. Fig. 5 is a view of the blank of Fig. 4 with paste applied thereto. Fig. 6 is a view of the blank of Fig. 5 with the rectangular piece of Fig. 3 properly placed thereon. Fig. 7 is a view of the blank of Fig. 6 with the upper flap folded down on its permanent place; and Fig. 8 is a view of the blank of Fig. 7 with its lower flap folded over, like the upper one, upon the rectangular piece, and the bag thus completed. Fig. 9 is an isometric view of the bag of Fig. 8 opened out. Fig. 10 is a view of the inside of the bottom of the bag of Fig. 9. Fig. 11 is a view of a flat paper blank like that of Fig. 4 after it has received an additional fold, as hereinafter described. Fig. 12 is a view of the blank of Fig. 11 with paste properly applied thereto. Fig. 13 is a view of a rectangular piece of paper identical with that of Fig. 3. Fig. 14 is a view of the blank of Fig. 12 with the said rectangular piece properly placed thereon. Fig. 15 is a view of the blank of Fig. 14 with one of the side flaps folded down upon the rectangular piece; and Fig. 16 is a view of the same with both side flaps thus folded down, and the bag thus completed. Fig. 17 is a view of the bag of Fig. 16 opened out. Fig. 18 is a view of the upper side, and Fig. 19 is a view of the lower end, of a tucked paper tube suitable for making a square-bottom paper bag. Fig. 20 is a view of a rectangular piece of paper substantially identical in size with the bottom of the bag to be made. Fig. 21 is a view of the blank of Figs. 18 and 19 with its lower portion folded out into a box-like shape. Fig. 22 is a view of the lower end of the blank of Fig. 21. Fig. 23 is a view of the blank of Figs. 21 and 22 with the upper and the lower side of the box-like form folded temporarily backward, and the other two sides folded permanently down in their places. Fig. 24 is a view of the blank of Fig. 23 with paste properly applied thereto. Fig. 25 is a view of the blank of Fig. 24 with the rectangular piece of Fig. 20 properly placed thereon. Fig. 26 is a view of the blank of Fig. 25 with the lower flap folded down; and Fig. 27 is a view of the same with both lower and upper flaps folded down upon the rectangular piece, and the bag thus completed. Fig. 28 is an isometric view of the bag of Fig. 27 opened out. Fig. 29 is an isometric view of a bag precisely like that of Fig. 28, except that it is so made that the upper and lower sides of the box-like form of Figs. 21 and 22 are folded inwardly, and the other two sides are folded outwardly, to the end that the latter may be the flaps ultimately folded down upon the rectangular piece after that piece has been placed upon the blank with the upper and the lower flap beneath it.

A, B, and C are the rectangular pieces of Figs. 3, 13, and 20, respectively.

D and E are the side folds, while F and G are respectively the top and bottom flaps, of the blanks and bag shown in Figs. 4 to 9, inclusive.

H and I are respectively the top and bottom folds, while J and K are the s ic fl ; o the blanks and bag shown in Figs. 11, 12, 14, 15, 16, and 17.

L, M, N, and O are the four sides of the box-like form of the bottom of the blank shown in Figs. 21 and 22.

P and Q are the side folds of the blanks shown in Figs. 23 to 26, inclusive, while R and S are respectively the top and the bottom flap of the blanks and bag shown in Figs. 23 to 28, inclusive.

T is the paste applied to sundry of the blanks, as shown.

The method of folding the bottom of the satchel-bottom paper bag shown in Fig. 8 is as follows: The middle portion of the lower edge of the upper side of the flat paper tube of Fig. 1 is seized and folded back on the line X X of Figs. 1, 4, and 5, while the middle portion of the lower edge of the lower side of that tube is held in its place. That operation causes the side folds, D and E, to be formed as shown in Fig. 4. Paste is then applied to the presented borders of those folds, and also of the flaps F and G. Then the piece A is placed in position as shown in Fig. 6. Then the flaps F and G are folded down upon the piece A, and the bag thus completed.

The method of folding up the bottom of the bag shown in Fig. 16 differs from the foregoing only in that before placing the rectangular piece upon the blank shown in Fig. 4 that blank has its top and bottom flaps folded over on the lines Y Y and Z Z, respectively, at the same time that its side folds are folded down outwardly on the lines V V of Fig. 11, and in that the side flaps or folds, instead of the top and bottom fold, are folded on the outside of the rectangular piece.

The method of folding up the bottom of the square-bottom bag shown in Fig. 27 is as follows: The lower end of the tucked paper tube of Figs. 18 and 19 is opened up into the box-like form shown in Figs. 21 and 22. Then the sides L and N of that box-like form are folded outwardly, and the flaps P and Q are folded inwardly, so that all of them rest flatly upon the blank, as shown in Fig. 23. Then paste is applied to the border of the presented octagon, as shown in Fig. 24. The rectangular piece C is then placed in position, as shown in Fig. 25, and the flaps R and S are then folded down upon that piece, and the bag thus finished.

This invention differs from that shown in Letters Patent of the United States No. 242,664, for a paper bag, granted to C. A. S. Lockwood, June 7, 1881, in that Lockwood's rectangular flap is much smaller than the bottom of the bag, and is placed within all four of the folds of that bottom, whereas my inserted rectangular piece is substantially identical in size with the bottom of my bag, and is placed between the two pairs of folds of that bottom.

The first of these new features of my bag gives the bottom a self-defining edge all around it, and thus facilitates the filling of the bag in such a way that, when being filled, it will stand alone, and also gives the bottom several thicknesses of paper at all places but one, and likewise closes all pockets that would otherwise remain open in the folds of the bottom for the reception and consequent waste of the substance placed in the bag. The second of these new features so much facilitates the construction of the bag as to render its manufacture practicable by machinery, whereas the bag shown in the patent to Lockwood can be made only by hand.

I claim as my invention—

A paper bag which has its bottom made by pasting a separate piece of paper, substantially identical in size with that bottom, between two pairs of folds made in the lower end of the paper tube which constitutes the body of the bag, all substantially as described.

WILLIAM H. HONISS.

Witnesses:
   ALBERT H. WALKER,
   WILLARD EDDY.